United States Patent Office 3,557,157
Patented Jan. 19, 1971

3,557,157
PROCESS FOR PREPARING TETRAKIS (ALKYL OR ALKENYL-AMINO) ETHYLENES
Harold I. Weingarten and William A. White, St. Louis, Mo., assignors to Monsanto Company, St. Louis, Mo., a corporation of Delaware
No Drawing. Filed Jan. 3, 1967, Ser. No. 606,571
Int. Cl. C07c 85/00, 87/24
U.S. Cl. 260—583                                  3 Claims

ABSTRACT OF THE DISCLOSURE

The present invention relates to a process for the preparation of tetrakis(disubstitutedamino)ethylenes by the pyrolysis of tri(disubstituted)methanes. The products of the invention have utility in the preparation of chemiluminescence agents, in making charge transfer complexes, and as reaction intermediates.

---

The present invention relates to a new process for the preparation of tetrakis(disubstitutedamino)ethylenes.

Previous methods of preparing the tetrakis(disubstitutedamino)ethylene compounds such as the alkyl compounds have been exceedingly costly because of the need for rare, expensive starting materials, or subject to unfavorable substituent scrambling of the starting material at reaction conditions.

The present process is an improvement over known methods in that greater purity of the product results from the use of the specific starting materials set forth herein. It has been found that these specific reactants avoid the difficulty of scrambling interchange of alkylamino or the other substituents which was present in the methods previously employed.

It has now been found that tetrakis(disubstitutedamino) ethylenes having the formula $(R_2N)_2C=C(NR_2)_2$ can be prepared by pyrolysis of tri(disubstitutedamino)methanes of the general formula, $HC(NR_2)_3$, where R is selected from the group consisting of hydrocarbyl radicals of from 1 to 5 carbon atoms including aliphatic and alicyclic radicals, for example, the methyl, ethyl, propyl, butyl, pentyl radicals, including both straight chain and branched saturated and unsaturated isomers; and aryl radicals of 6 to 20 carbon atoms including the phenyl, naphthyl, and anthracyl radicals; and also heterocyclic radicals having from 4 to 20 carbon atoms, the heterocyclic radicals, also having substituents of the group consisting of nitrogen and oxygen, for example, the morpholino, pyrrolidinyl and the piperidinyl radicals. It is also possible by this method to prepare tetrakis(disubstitutedamino)ethylene compounds in which the R groups of the formula below are not all identical.

The general equation for the present process is $$2HC(NR_2)_3 \rightarrow (R_2N)_2C=C(NR_2)_2 + 2HNR_2$$

wherein the symbols have the meaning set forth above.

The process for the preparation of the desired tetrakis (dialkylamino)ethylene compounds is to heat the tri- amine set forth above at a temperature of from 100° C. to 300° C., a preferred range being from 150° C. to 250° C. While a solvent is not necessary in carrying out this process, it is often desirable to employ a non-reactive solvent, for example, xylene, dichlorobenzene, isopropylbiphenyl, or 1,2-bis(2′-methoxyethoxy)ethane. The pressure imposed upon the reaction system is not a critical variable so that vacuum, atmospheric or super-atmospheric conditions may be employed. The product is separated from the reaction mixture by distillation, solvent extraction, liquid phase chromotography or other separation means.

The preparation of the triamine starting material has been described by H. Weingarten and W. A. White JACS 88, 850 (1966), H. Brederick et al. Angew. Chem. 78, 147 (1966) and D. H. Clemens et al. J. Org. Chem., 27, 3664 (1962).

The following examples illustrate specific embodiments of the present invention.

EXAMPLE 1

The preparation of tetrakis(dimethylamino)ethylene is carried out by charging 2.20 g. (0.0152 mole) of tris(dimethylamino)methane into a 10 ml. round-bottom flask equipped with a reflux condenser, with the reaction system being kept under a positive pressure of dry nitrogen. The reaction flask is immersed in an oil bath and the reaction kept at reflux by adjusting the temperature upward between 150° C. and 190° C. as the reaction proceeds. The appearance of the desired tetrakis(dimethylamino)ethylene is monitored by taking NMR spectra of aliquots (tau 7.42 (s), benzene solvent, tetramethylsilane internal standard). When the reaction is completed as evidenced by the cessation of amine evolution, the condenser on the flask is exchanged for a distilling head, and the product is distilled yielding 1.25 g. (82%) of tetrakis(dimethylamino)ethylene, B.P. 50° C. (1 mm.), $n_D^{25}$ 1.4806, molecular weight 200 (mass spectrum), showing no significant impurities in the NMR analysis.

EXAMPLE 2

The corresponding tetrakis(diisobutylamino)ethylene is prepared by the same procedure as Example 1, charging 4.0 g. (.01 mole) of tris(diisobutylamino)methane into a 25 ml. round-bottom flask equipped with a reflux condenser, with the reaction system kept under a positive pressure of dry nitrogen. The reaction flask is immersed in an oil bath monitored at 250° C. The degree of reaction is monitored by loss of diisobutylamine.

Uses for the present tetrakis(dialkylamino)ethylenes include the preparation of chemiluminescence agents. For example the compound of Example 1 when exposed to air emits light in the course of oxidation. The tetrakis (dialkylamino)ethylenes are also used in making charge transfer complexes, and as reaction intermediates in organic syntheses.

What is claimed is:
1. Process for the preparation of a compound having the formula $(R_2N)_2C=C(NR_2)_2$ in which R is an alkyl or alkenyl radical of from 1 to 5 carbon atoms which comprises heating a compound having the formula $HC(NR_2)_3$ at a temperature of from 100° C to 300° C.
2. Process for the preparation of a compound having the formula [(CH₃)₂N]₂C=C[N(CH₃)₂]₂, which comprises heating a compound having the formula

HC[N(CH₃)₂]₃ at a temperature from 100° C. to 300° C. to form the

[(CH₃)₂N]₂C=C[N(CH₃)₂]₂

3. Process for the preparation of a compound having the formula [(iC₃H₇)₂N]₂C=C[N(iC₃H₇)₂]₂, which comprises heating a compound having the formula HC[N(iC₃H₇)₂]₃ at a temperature from 100° C. to 300° C. to form the

[(iC₃H₇)₂N]₂C=C[N(iC₃H₇)₂]₂.

References Cited

UNITED STATES PATENTS 3,141,906  7/1964  Chambers _____ 260—583(G)

CHARLES B. PARKER, Primary Examiner

R. L. RAYMOND, Assistant Examiner

U.S. Cl. X.R.

260—247.5, 293, 326.85, 570.5